May 22, 1962  A. C. SCINTA  3,035,298
WINDSHIELD CLEANING SYSTEM
Filed June 16, 1958
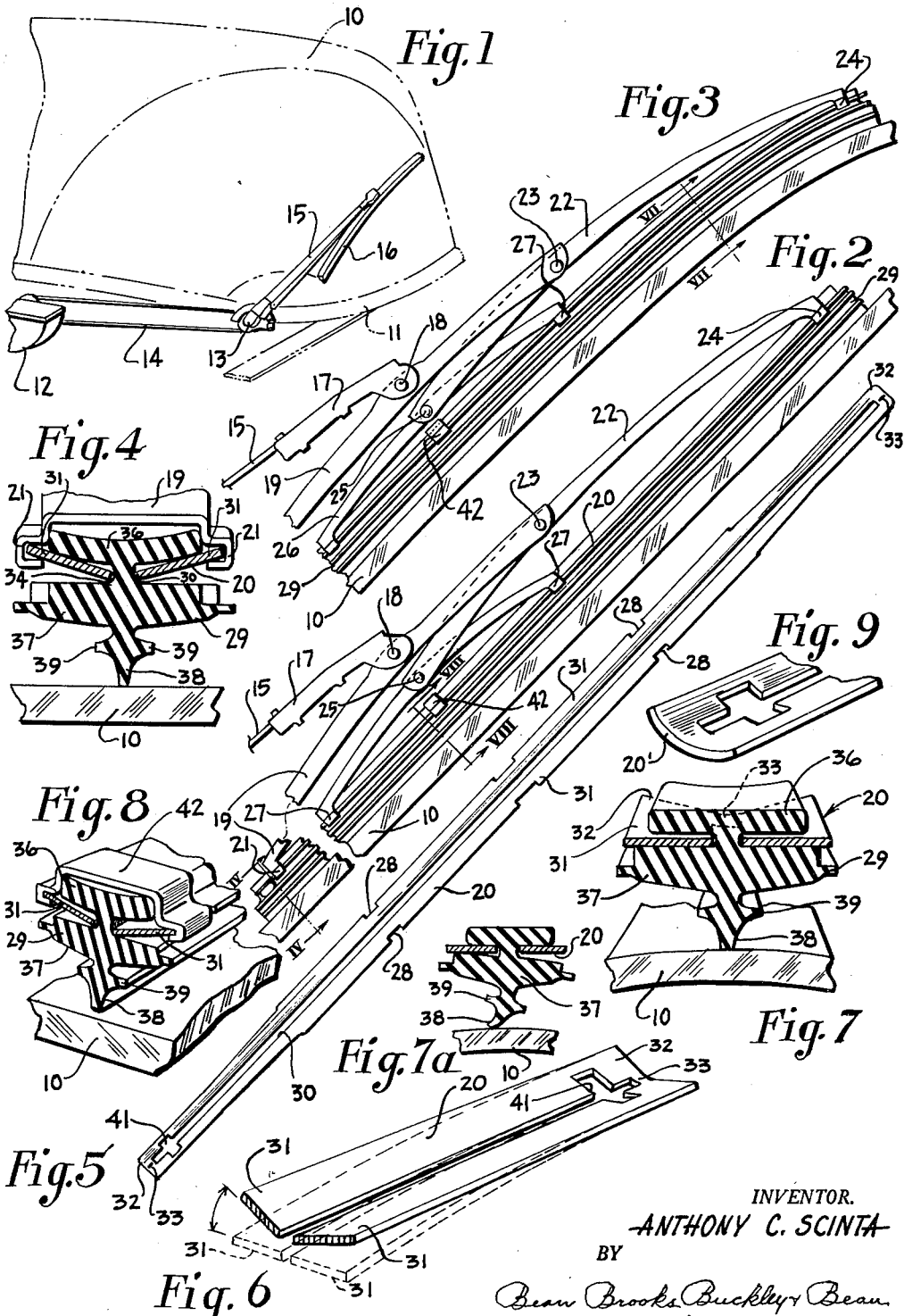
INVENTOR.
ANTHONY C. SCINTA
BY
Bean Brooks Buckley & Bean
ATTORNEYS.

United States Patent Office 3,035,298
Patented May 22, 1962

3,035,298
WINDSHIELD CLEANING SYSTEM
Anthony C. Scinta, Hamburg, N.Y., assignor to Trico Products Corporation, Buffalo, N.Y.
Filed June 16, 1958, Ser. No. 742,073
11 Claims. (Cl. 15—250.42)

This invention relates to windshield cleaning or wiping systems, and particularly to the wiping blade which is the vital and fundamental element in all wiper systems for maintaining vision.

The invention here lies in an improved wiper wherein the squeegee or rubber wiping element is held in contact with the glass by means of an improved backing acting on a new principle which applies a variable pressure on the wiping element over the varying curvatures while the blade is traveling across the wipe pattern desired for vision. In the illustrated embodiments of the present invention, the blade is backed by a surface conforming strip to which arm pressure is applied at spaced points to conform it substantially to the underlying windshield surface. If the underlying surfaces are deeply or sharply curved, then the backing strip is shaped thereabout by the arm pressure being applied to the strip in a direction normal to a face thereof, or substantially normal thereto, to flex the strip through the reactive force of such sharply curved surface accordingly; if the underlying windshield surface is flat, then the backing strip, or the immediate medial portion thereof, is displaced so as to transmit the arm pressure through the strip in a direction more or less transverse thereof. Since the strip is more rigid and less flexible to pressure exerted transversely thereof, it will thereby afford a stiffened support for the intermediate or central portion of the blade to resist the lifting of the blade by contrary wind currents from surface areas which are of lesser curvature or that are substantially flat. The backing strip is slotted to receive a wiping element and has in the entrance way of this slot an enlarged opening to permit the threading of the wiping element therethrough. The end portions of the backing strip are unslotted and are creased or bent to shape them in the form of a V to produce a desirable tensioning of the inner margins of the backing strip longitudinally thereof and to displace them normally from coplanar relation and angular to the direction of flexing. This causes the sides of the backing strip to extend at an angle to the horizontal whereby a greater resistance to bending throughout the length of the backing strip results. This, in turn, causes the pressure applied to the superstructure of the wiping blade assembly to be distributed evenly throughout the length of the blade, especially when the blade occupies a position on the substantially flat portions of the windshield. However, as the blade moves from the flat portion to the curved portion, the backing strip flexes by the reaction of the curvature and in the vicinity of the bend in the glass. Here the side rails of the strip tend to flatten out into coplanar relation for easy flexing.

All of this unique action is the result of the forces of tension and compression, the backing strip means with its wider dimension extending transversely of the rubber body and causing the blade to act and react to the surface contour of the glass in a manner that lessens the pressure required for flexing in the medial portion of the blade when it passes over the sharper convex area of the crest of the windshield. During this movement the easy flexing of the backing helps to apply added pressure on the blade's ends. Conversely, as the blade is moved up and over the crest onto the flat frontal section of the windshield, the sides of the backing become more displaced from the coplanar relation, the backing strip becomes more rigid, giving a better proportion of pressure in the open space medially of the blade. This latter action is the result of the out-of-planar position of the two side portions of the strip as they assume an angular relation with each other, in effect resembling that of a channel. The basic principle involved in this flexing action of the backing results in an alternate stiffening and limbering of the same; in stiffening, it maintains the pressure in the wiping contact on a flat surface, and in limbering, it enables surface conformance and augments the pressure on the ends.

The side rails or portions of the backing strip are normally out of parallel with each other. They are not in the same plane. They are angled away from each other and this gives desirable stiffness where needed. In this angled position, the thrust or pressure of the wiping arm is transmitted through the angled side rail portions partaking of the greater stiffness thereof. The inner margins of the side portions support the rubber wiping element therebetween in the manner of a flexible joint extending lengthwise of the blade, and by this angular disposition of the side portions there is an amplification of pressure provided at the medial portion of the blade for holding the latter in firm wiping contact with the glass. On the flat portions of the windshield the stiffness of the backing is important in order to transmit pressure to the parts of the blade that are intermediate the points of pressure application. As the blade moves onto a curved surface and the backing is flexed, these side portions of the backing will assume a coplanar position in which they flex more easily. This relatively easy flexing of the backing, however, is a characteristic which is limited to the part of the backing where the side portions are coplanar, and the side portions never become coplanar throughout their entire length. Even on the sharp curvature they retain some of this angular position at the ends, and there is a gradual merging from the originally angular position at the end into the coplanar position that is assumed. Along the line of this tapered off merging between the coplanar and the original angular position, the backing possesses a variable stiffness. There is never any time when the backing is uniformly flexible. As the backing is flexed and the central portions assume their coplanar position, this portion of the backing becomes much more easily flexed and requires less arm pressure. This enables the pressure distributing members to apply a greater amount of pressure at the ends where it is needed to bring them into wiping contact.

From the foregoing, it will appear that while the blade is on a curved surface, and if for any reason the central portion of the blade should become elevated as a result of an attempted wind lift of the blade, it will receive a greater supporting reinforcement from the end portions which retain all or part of their original stiffness on account of the fact that the end portions of the side members have not been shifted from their angular attitude to that of the coplanar position. When the blade is functioning over a sharply curved surface, it is desirable to have more flexibility in the backing. The sharply curved position of the structure serves by itself to apply needed pressure within this sharply curved portion of the blade.

The change-over action in the backing strip from one position to another position changes the flexing characteristic of the backing. On the sharply curved portion the ends of the wiping blade are retained in firm wiping contact with the windshield whereas the portion of the wiping element which is traversing the curved portion of the glass yields to permit firm wiping contact with the curved portion. This action is reversed when the wiper element enters the flat portion of the windshield from the curved portion and thereby causes optimum wiping pressure to be supplied to the flat portion because the side portions of the backing again assume an out-of-planar or angular position in relation to each other wherein all portions of the backing strip provide increased resistance to bending of the wiping element.

Therefore, the object of the invention is to provide a curved windshield wiper which will maintain its wiping contact against wind lifting.

A further object of the invention is to provide an anti-wind lifting blade in which the arm pressure is applied in more effectively functioning to successfully resist the blade lifting tendency of strong wind currents.

A still further object of the invention is to provide a wiping blade which is low seating upon the windshield glass and the wiping lip is of a character to defeat its bagging against the formation of pressure receiving pockets.

The above mentioned action is facilitated by the use of a superstructure which causes the arm pressure to be distributed evenly over a plurality of points of contact with the backing. The present invention will be more fuly understood when the following portions of the specification are read in conjunction with the accompanying drawings wherein:

FIG. 1 is a fragmentary perspective view of a portion of an automotive vehicle having a curved windshield which is adapted to be cleaned by the improved wiper blade construction of the present invention;

FIG. 2 is a fragmentary elevational view of the improved wiper blade construction of the present invention on the relatively flat portion of the windshield;

FIG. 3 is a fragmentary elevational view of the improved wiper blade of the present invention on the curved portion of the windshield;

FIG. 4 is a view taken along line IV—IV of FIG. 2;

FIG. 5 is a plan view of the improved backing strip for the wiping element;

FIG. 6 is a fragmentary view of a portion of the improved backing strip of the present invention showing in dotted lines the relative positions of the side portions thereof when on the curved portion of the windshield;

FIG. 7 is a view taken along line VII—VII of FIG. 3 illustrating the position which the backing strip assumes while on the curved portion of the windshield; FIG. 7a shows the position which the wiping element assumes while the wiper blade moves to the right;

FIG. 8 is a view taken along line VIII—VIII of FIG. 2 showing the clip structure for holding the side portions of the backing strip against sideward movement relative to each other; and FIG. 9 depicts a modified construction wherein the backing strip is of a cross sectional configuration of uniform curvature.

In FIG. 1 a windshield 10 is shown mounted on molding 11 in the conventional manner. A windshield wiper motor 12 which is suitably mounted on the vehicle is adapted to transmit oscillatory motion to rockshaft 13 as by cable connection 14 to thereby cause oscillation of wiper arm 15 and wiper blade 16 suitably attached thereto.

The improved wiper blade of the present invention is shown in FIGS. 2 through 8. The wiper arm 15 is adapted to be coupled to clip 17 which has one end thereof riveted at 18 to primary lever 19 of the wiper blade superstructure. Primary lever 19 has one end thereof formed around resilient flexible backing strip 20 at points 21 (FIGS. 2 and 4). The other end of lever 19 is riveted to secondary lever 22 at point 23. Secondary lever 22, in turn, has one end thereof slidably formed around the other end of flexible backing strip 20 at points 24 in a manner similar to that shown in FIG. 4 relative to points 21. The other end of secondary lever 22 is riveted at 25 to yoke 26 having formed ends 27 (which are similar in construction to that depicted in FIG. 4 relative to end 21 of lever 19) for engaging recessed portions 28 (FIG. 5) of flexible backing strip 20. It can readily be seen that the above described superstructure permits relative movement between the tapered ends of the backing strip 20 and points 21 and 24 of levers 19 and 22, respectively, to permit the wiper element 29 carried on backing strip 20 to conform to various portions of curved windshield. It is to be further noted that the pressure supplied by arm 15 is transmitted through primary lever 19 and secondary lever 22 to points 21 and 24, respectively, proximate the ends of backing strip 20, points 21 and 24 being substantially equidistant from rivet 18 in the present embodiment. Furthermore, secondary lever 22 supplies a certain amount of pressure to yoke 26 which is self-adjusting, as required, to assist in keeping the central portion of wiping element 29 in contact with the windshield 10. While, as noted above, the primary pressure is supplied to backing strip 20 by the ends of levers 19 and 22, yoke 26 supplies pressure to intermediate points substantially equidistant from rivet 25 to prevent backing strip 20 from bending unevenly so as to buckle away from the windshield. Furthermore, it is to be noted that the pressure applied by the superstructure consisting of levers 19 and 22 and yoke 26 is distributed at various spaced points along the backing strip 20 to enhance the desired type of operation heretofore described and explained in further detail hereafter.

As can be seen from FIGS. 4, 5, 6, 7 and 8, the flexible backing strip 20 consists of elongated sides 31 defining a slot 30 which extends substantially throughout the length thereof. The flexible backing strip may be made of a unitary piece of stock with the end portions 32 closing the slot 30 and joining the elongated side portions 31. The end portions 32 are formed into a V-shape with a crease 33 to cause side portions 31 to assume the position shown in FIG. 4 (and in the solid line position of FIG. 6) when the backing strip 20 is relaxed on the flat portion of the windshield.

Of major importance in the instant invention is the discovered characteristic of a form incorporated in the contour of a flexible backing strip 20 of greater width than thickness in which the separation of the two side portions 31 is accomplished by means of a channel extending substantially from end to end, but connected on both ends by a transversely uninterrupted portion, unslotted, permanently creased or bent into a V-shaped form. This creased formation of the end portion of the backing strip produces a desired support of the inner margins of the backing strip longitudinally thereto and extending inwardly from both ends.

The sides 31 of the backing strip 20 are caused to assume an angular relation with each other by the creased end portions 33 thereby creating a greater resistance to bending of the backing strip. The backing strip 20 provides a means of applying pressure from the superstructure of the wiping element and assembled backing for distribution evenly throughout the length of the blade, this desirable effect being present when the blade is positioned on the substantially flat portion of the windshield.

However, as the blade moves from the flat portion of the windshield to the curved portions, the backing member 20 flexes in the vicinity of the bend in the glass more freely, as a result of the flattening out of the side portions through the bending action of the backing. Thus the backing structure provides the unique feature of flexing in such a manner that the resistance to flexing varies inversely with the degree of curvature of the glass. The greater the degree of curvature, the less the amount of the resistance to flexing, thus providing the unexpected result of the instant invention. In all of the windshield wiper blades ever made to date and having resilient backing members, the common characteristic is that the greater the required amount or degree of flexing, the greater the force required to continue the flexing. The more the flexing, the less the ease of flexing in the backing. In the instant invention the greater the flexing, the lesser the amount of arm pressure required to cause the wiping element to conform to the glass. The sharper the curvature of the windshield, the smaller the amount of arm pressure that will be needed to effect the blade to conform.

In this enumerated respect the backing is unique, operating through a new principle of operation and serving the dual purpose of extending the distribution of arm pressure from the blade's superstructure more effectively on relatively flat surfaces and flexing more freely when on the curved surfaces than is otherwise possible with the normally flat backing strips of either straight or precurved character.

As can be seen from FIG. 4, the slot 30 of backing strip 20 accommodates the portion 34 of wiping element 29. The increased resistance to bending of backing element 20 when in the position shown in FIG. 4, which this element assumes when the wiper is on the relatively flat portion of the windshield, transmits thrust or pressure and thereby causes a uniform wiping pressure to be supplied to wiper element 29 to maintain it in optimum wiping contact with windshield 10. The wiping element 29 further includes a broad lateral portion 36 and a broad lateral portion 37 which are at the ends of portion 34. These broad portions maintain the wiper element 29 in position in the slot 30 of flexible backing strip 20. Sides 31 of flexible backing strip 20 converge along flexible portion 34 of wiper element 29 and by reason of engaging this portion of the wiping element, the angularly disposed side portions 31 transmit an increased thrust which is in accordance with their angular disposition. Connected to the underside of broad portion 37 is a wiping lip 38 which has a portion thereof formed on both sides thereof into a broadened bead 39 which extends throughout the length of the wiping element 29. This bead serves the purpose of providing the lip portion 38 with increased lateral rigidity thereby preventing a localized deformation which is conducive to wind-lift. However, this bead does not interfere with flexing of the wiping element as required during oscillation in traversing a curved windshield nor does it interfere with the uniform bodily flexing of the entire wiping lip 38. Furthermore, the lip portion 38 between bead 39 and flat portion 37 permits an amount of lay-over of wiping lip 38 during oscillatory motion of the wiper.

An enlarged slot 41 (FIG. 5) is provided proximate one end of the backing strip 20 to permit the threading of the wiping element 35 to assembled position thereon.

As mentioned above, FIG. 4 and the solid line portion of FIG. 6 depict the configuration of backing strip 20 when the latter is on the flat portion of the windshield to cause the pressure received from wiping arm 15 to be distributed uniformly on the spanned portions of wiping element 29 and also have increased resistance against bending. In FIGS. 7 and 7a a portion of the backing strip 20 is shown in a flattened position, this position being assumed or approached by only the portion of the backing strip which is traversing the crest or any other curved portion of the windshield. While this portion assumes this flattened position, the remaining portions of the backing strip still retain substantially the position shown in FIGS. 4 and 6 (solid line position). When the blade is passing over the sharper curvature, more flexibility in the backing is desirable. The bending of the backing on these curved portions of the windshield is achieved by the reaction to the curvature of the glass. The end portions of the backing strip 20 which are not in a flattened condition maintain a good wiper contact with the respective portions of the windshield with which they are associated while the central portion yields to permit the wiper blade to smoothly traverse the crest of the windshield while maintaining good wiping contact therewith.

It is to be noted that wind-lift is usually caused when the central portion of the wiping lip tends to buckle and permits wind to pass underneath the blade thereby lifting the entire blade from the shield. In normal operation the blades will lift first when the wind is approaching the blades diagonally from the center of the automobile. The lifting will take place first when the blade is moving toward the center of the car. Under this condition the friction of the blade on the glass causes the lip to flex toward the outside of the car in a trailing position. The position of the lip is such that the air currents are trapped. Lifting begins over a short length of the blade lip; usually it is intermediate pressure points of the blade superstructure. As the lifting starts, the air movement produces a camming effect extending the lifting throughout the length of the blade.

However, in accordance with the present invention, the reinforcing bead 39 tends to obviate the buckling tendency of the lip, especially on the flat of the windshield. However, because of the distribution of forces on the backing strip when the central portion of the backing strip is curved, the wiper blade is caused to be maintained with increased wiping pressure at its ends, less arm pressure being needed to cause the flexing of the backing across its middle portion. Furthermore, it will be evident that when the wiper blade moves away from the curved portion of the windshield and enters the frontal portion, the part of the backing strip which had been flattened out, such as depicted in FIGS. 7 and 7a, tends to reassume the angled position with respect to the direction of flexure as shown in FIGS. 4 and 6 and in doing so causes an action which brings the wiper into firm wiping contact with all portions of the windshield thereby decreasing the wiper's susceptibility to lift while providing the desired wiping pressure which is necessary for optimum wiping operation, and which has heretofore been unobtainable.

A clip or saddle 42 (FIG. 8) may be used for retaining the sides 31 of backing strip 20 in operative relationship relative to each other so as to prevent the wiping element 35 from being dislodged therefrom as when operating on a dry or wet-dry windshield.

In FIG. 9 a modified construction 20' of the backing strip is shown. This backing strip 20' is of a configuration wherein the cross sectional contour thereof is of a gradual curvature to provide substantially the same results described above relative to backing element 20. It will readily be appreciated that backing strip 20' provides the same type of action described above relative to backing element 20 and it will be appreciated that other configurations may be used which will give the same type of action.

While I have described preferred embodiments of the present invention, I desire it to be understood that it is not to be limited thereto but may otherwise be embodied within the scope of the following claims.

I claim:

1. A windshield wiper including a wiping element and a resilient backing strip of greater width than thickness divided longitudinally into two side portions extending between the opposite ends of the backing, said ends constituting transversely extending cross straps each shaped in angular formation to angularly position said side portions with their inner margins converging into said wiping element out of coplanar relation with each other, the areas of said side portions between the cross straps twisting about their longitudinal axes in reactance to windshield surfaces of sharper curvature to cause said side portions to approach a coplanar relation for easier surface conforming flexation, whereby varying degrees of flexibility is imparted to said backing according to the angular disposition of said areas of said flexible backing.

2. A wiper for windshields having a surface of compound curvature with a frontal area joined to flanking lateral areas by relatively more sharply curved crest areas, said wiper comprising a squeegee body having a resilient surface conforming backing strip, and pressure applying means supporting the backing strip at longitudinally spaced intervals to define an uninterrupted flat intermediate portion between the intervals of support, the intermediate portion of the backing strip being normally displaced at an angle to the direction of flexing of the wiper to stiffen the backing support for wiping surface areas of less curvature, said displaced portion being reactive to surface areas of greater curvature to increase its displacement to the direction of flexing for easier surface conformance.

3. A wiper for curved windshields, comprising a flexible wiping blade having a resilient surface-conforming backing strip, and a superstructure bearing at longitudinally spaced points on the backing strip for applying arm pressure therethrough to the blade, said strip having flat side rails supporting the blade therebetween and tied together at their opposite ends by cross members that support said rails normally at an obtuse angular relation for stiffened support of the blade on a substantially flat surface, portions of the obtuse-angularly related side rails being yieldable toward coplanar relation in reactive response to a more sharply curved windshield area for easier surface conformance.

4. A wiper for curved windshields, comprising a flexible wiping blade having a resilient surface-conforming backing strip, and a superstructure bearing at longitudinally spaced points on the backing strip for applying arm pressure therethrough to the blade, said strip having spaced flat side rails for supporting the blade therebetween and tied together at their opposite ends by cross members, at least one of said side rails normally lying at an angle to the direction of flexing of the wiper throughout its entire length for stiffened support of the blade on a substantially flat surface, a portion of the angularly disposed side rail being yieldable toward a planar position with respect to the other rail in reactive response to a more sharply curved windshield area for easier surface conformance.

5. A windshield wiper for a surface of varying compound curvature, comprising a blade body with a relatively thin wiping edge, a resilient backing strip for the body operatively supporting the wiping edge for surface conformance, and an arm-pressure distributing superstructure operatively connected to the backing strip at longitudinally spaced points of support for conforming the portion between the supporting points to surface curvature, said supported portion being normally displaced at an angle to the direction of flexing of the blade body for transmitting arm-applied pressure substantially edgewise through one longitudinal margin of the strip while wiping over a relatively flat surface, said supported portion being twistingly reactive to a sharper curvature to increase its angle of displacement to the direction of flexing for increasing its surface conforming characteristic.

6. A windshield wiper for a surface of varying compound curvature, comprising a blade body with a relatively thin wiping edge, a resilient backing strip for the body operatively supporting the wiping edge for surface conformance, and an arm-pressure distributing superstructure operatively connected to the backing strip at longitudinally spaced points of support, said backing strip being divided longitudinally into side portions having their inner edges parallel, at least one of said side portions being normally displaced at an angle to the direction of flexing of the blade body, the angularly disposed side portion being twistingly reactive to a sharper curvature to increase its angle of displacement to the direction of flexing for increasing its surface conforming characteristic.

7. A windshield wiper including a wiper blade mechanism comprising a wiping element supported by a resilient backing member having two distinct side rail portions adapted to traverse portions of various curvatures of a curved windshield, characterized in that said backing member has a cross-section profile defining an obtuse angle when the blade is on a relatively flat portion of the windshield and a flatter profile with said angle approaching a straight angle when the blade is on a relatively more sharply curved portion of the windshield so that the pressure of the blade normal to the windshield is greater for the relatively flatter portions of the windshield as a consequence of the greater obtuse angle.

8. A curved windshield cleaner system, comprising a flexible wiping blade backed by a surface conforming strip, means supporting the strip at spaced distances longitudinally thereof for applying arm-pressure thereto, said strip having its entire portion between the spaced points of support normally lying at an angle to the direction of flexing of the blade for transmitting a part of the arm pressure edgewise through the portion transversely of the blade to stiffen the backing support for said portion when wiping a flat surface, said inclined portion being responsive to the reactionary force of a more sharply curved surface when passing thereover to increase its inclination to the direction of flexing for increasing the surface conforming character of said portion between the spaced points of support.

9. A windshield wiper blade construction comprising a superstructure, a wiping element and a resilient flexible backing strip of greater width than thickness connecting said wiping element and said superstructure, means on said superstructure adapted to hold said backing strip at longitudinally spaced points, said resilient backing strip comprising elongated side portions normally supported at an obtuse angle relative to each other but reactable to surface contour change to assume a more coplanar relationship relative to each other in response to movement of said wiping element from a rectilinear to a curved condition, said wiping element having a lip portion adapted to contact and follow the curvature of a windshield, said lip portion having lateral bracing means substantially throughout the length thereof to prevent excessive lateral deflection due to external forces.

10. A windshield wiper blade construction comprising a superstructure, a wiping element and a resilient flexible backing strip of greater width than thickness connecting said wiping element and said superstructure, means on said superstructure adapted to hold said backing strip at longitudinally spaced points, said resilient backing strip comprising elongated side portions normally supported at an obtuse angle relative to each other but reactable to surface contour change to assume a more coplanar relationship relative to each other in response to movement of said wiping element from a rectilinear to a curved condition, said wiping element having a wide body and an overlying head forming oppositely facing lateral grooves to receive the inner margins of the side portions, the body extending laterally beneath the side portions beyond the side margins of the head to lever thereon when wiping over a partially wet surface.

11. A wiper, comprising a squeegee body with a wiping edge, resilient surface-conforming backing means therefor of variable sensitiveness to surface conformance and having laterally spaced side rails supporting the body therebetween, and a pressure applying yoke having depending seats on its opposite ends engaging the outer margins of the side rails, means normally holding the side rails displaced from coplanar relation for stiffer backing support for portions of the squeegee medially of the opposite ends of the yoke but permitting the rails to yield into coplanar relation to render them more sensitive for surface conformance during movement over a more sharply curved contour.

References Cited in the file of this patent

UNITED STATES PATENTS

| 2,697,241 | Oishei | Dec. 21, 1954 |
| 2,834,976 | Oishei | May 20, 1958 |
| 2,861,289 | Nesson | Nov. 25, 1958 |

FOREIGN PATENTS

| F17814 II/63c | Germany | Dec. 20, 1956 |
| 785,865 | Great Britain | Nov. 6, 1957 |